(12) United States Patent
Edwards

(10) Patent No.: US 7,029,121 B2
(45) Date of Patent: *Apr. 18, 2006

(54) TECHNIQUES FOR FACILITATING USE OF EYE TRACKING DATA

(75) Inventor: Gregory T. Edwards, Newark, CA (US)

(73) Assignee: Eyetools, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/772,826

(22) Filed: Feb. 4, 2004

(65) Prior Publication Data

US 2004/0156020 A1    Aug. 12, 2004

Related U.S. Application Data

(63) Continuation of application No. 10/017,540, filed on Dec. 12, 2001, now Pat. No. 6,712,468.

(51) Int. Cl.
*A61B 3/00* (2006.01)
*G06F 15/00* (2006.01)

(52) U.S. Cl. .................. 351/246; 702/187; 715/500

(58) Field of Classification Search ............ 351/200, 351/203, 205, 209, 210, 246; 702/108, 182, 702/183, 187; 707/101, 104.1; 715/700; 345/FOR. 156, 157
See application file for complete search history.

(56) References Cited

U.S. PATENT DOCUMENTS

| | | | |
|---|---|---|---|
| 5,651,107 A | | 7/1997 | Frank et al. |
| 5,886,683 A | * | 3/1999 | Tognazzini et al. ......... 715/700 |
| 6,067,565 A | | 5/2000 | Horvitz |
| 6,070,098 A | | 5/2000 | Moore-Ede et al. |
| 6,102,870 A | | 8/2000 | Edwards |
| 6,106,119 A | | 8/2000 | Edwards |
| 6,601,021 B1 | * | 7/2003 | Card et al. .................. 702/187 |
| 2001/0011211 A1 | | 8/2001 | Bushey et al. |
| 2002/0015064 A1 | | 2/2002 | Robotham et al. |
| 2002/0107972 A1 | | 8/2002 | Keane |

* cited by examiner

*Primary Examiner*—Ali Imam
*Assistant Examiner*—John R. Sanders
(74) *Attorney, Agent, or Firm*—Blakely Sokoloff Taylor & Zafman, LLP

(57) ABSTRACT

Individual eye tracking data can be used to determine whether an individual has actually looked at a particular region of a visual field. Aggregation of data corresponding to multiple individuals can provide trends and other data useful for designers of graphical representations (e.g., Web pages, advertisements) as well as other items that can be viewed. Representation of the aggregated viewing data, which indicates both regions viewed and regions not viewed, can be accomplished using several different techniques. For example, percentages of the number of viewers that viewed a particular region can be represented as a particular color, or the underlying image being viewed can be blurred based on and acuity gradient and the number of individuals viewing various regions. The various regions represented as viewed can be selected based on the type of viewing activity (e.g., reading, gazing) is associated with a particular region.

8 Claims, 7 Drawing Sheets

FIG. 3

TECHNIQUES FOR FACILITATING USE OF EYE TRACKING DATA

This U.S. Patent application is a continuation of U.S. patent application Ser. No. 10/017,540, filed Dec. 12, 2001 now U.S. Pat. No. 6,712,468.

FIELD

The invention relates to eye tracking. More particularly, the invention relates to techniques for using aggregated eye tracking data.

BACKGROUND

Devices currently exist that can track the movement of a person's eyes as that person engages in an activity, for example, using a computer system. Eye tracking devices generally consist of a camera and associated electronic components to produce data representing gaze positions (or "gaze data"). This gaze data can be used to determine where the individual is looking, which can be described in terms of fixations (a steady gaze for a predetermined period of time) and saccades (movement of the gaze between two points).

When the gaze data is combined with data representing graphical images presented to the user, the combined data indicates what the person was viewing (or "viewing data"). The viewing data can be used, for example, to determine whether a viewer has looked at all of the information presented. The viewing data is typically presented graphically as a series of circles and lines indicating the fixations and saccades, respectively. One disadvantage of typical viewing data and graphical representations of the viewing data is that only the viewing of a single user can be presented.

BRIEF DESCRIPTION OF THE DRAWINGS

The invention is illustrated by way of example, and not by way of limitation, in the figures of the accompanying drawings in which like reference numerals refer to similar elements.

FIG. 3 illustrates a second example World Wide Web page to be used for gathering eye tracking data.

DETAILED DESCRIPTION

Figure 1:
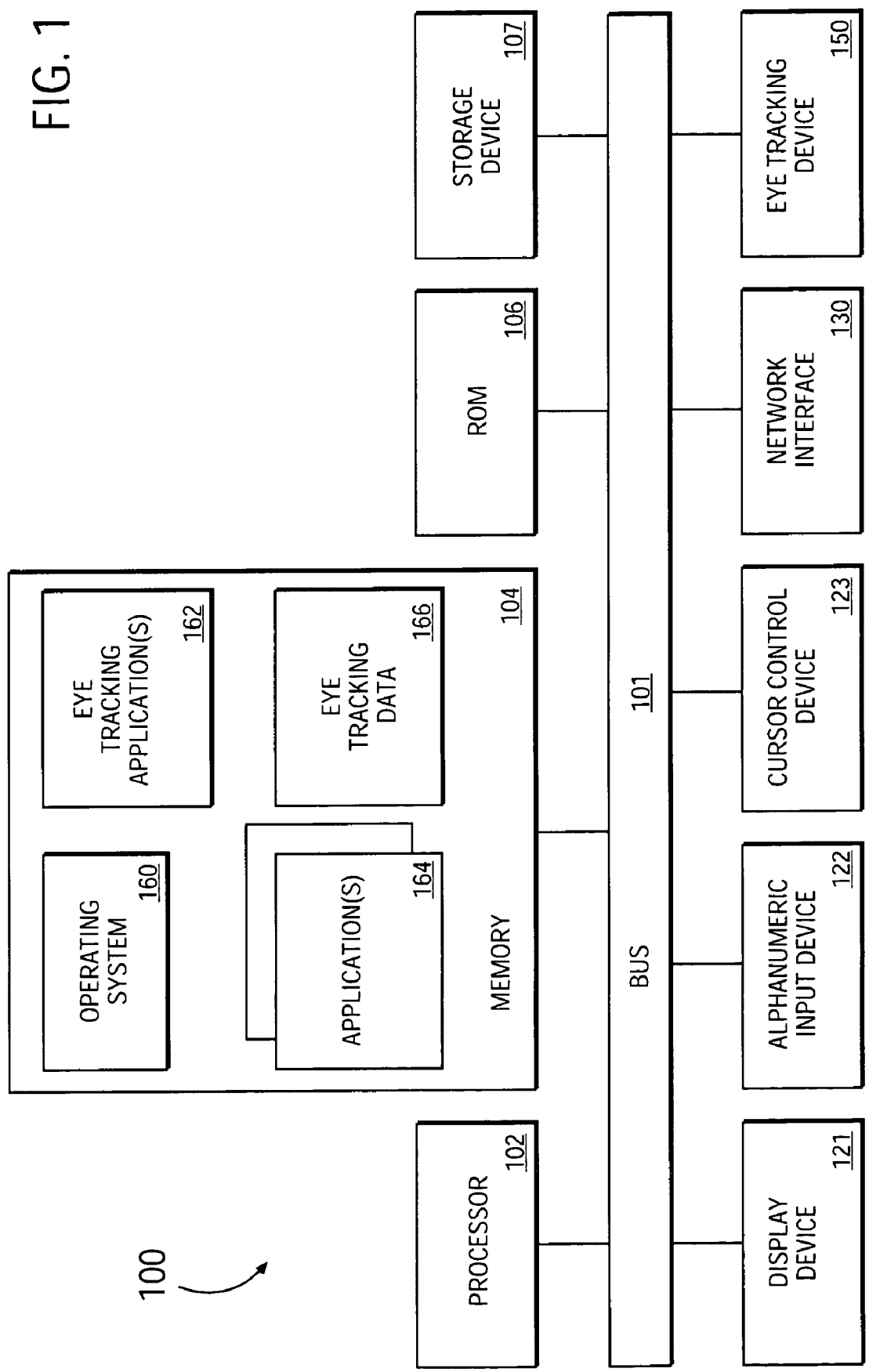
FIG. 1 is a block diagram of one embodiment of an electronic system having eye tracking functionality.

Techniques for using eye tracking data are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Described herein are techniques that include aggregation of eye tracking data. Aggregation can be accomplished in many ways, for example, by summing data or by averaging data. Other types of operations can also be used for aggregation including, but not limited to division, statistical analysis, etc. While described herein as summation and/or averaging of data, any data analysis operations can be performed to aggregate data.

Individual eye tracking data can be used to determine whether an individual has actually looked at a particular region of a visual field. A "region" can be any portion of a visual field, for example, a region can be a predetermined number of pixels on a display device, or an area of a physical environment. Aggregation of data corresponding to multiple individuals can provide trends and other data useful for designers of graphical representations (e.g., Web pages, advertisements) as well as other items that can be viewed.

Representation of the aggregated viewing data, which indicates both regions viewed and regions not viewed, can be accomplished using several different techniques. For example, percentages of the number of viewers that viewed a particular region can be represented as a particular color, or the underlying image being viewed can be blurred based on an acuity gradient and the number of individuals viewing various regions. The various regions represented as viewed can be selected based on the type of viewing activity (e.g., reading, gazing) associated with a particular region.

The aggregated viewing data can be used to provide various results depending on the environment and the parties involved. For example, the aggregated viewing data can be represented by a visual display, for example, by printing a physical copy of the data or by displaying the data with a computer monitor. The aggregated viewing data can be used to modify the monitored regions. For example, aggregated viewing data related to a Web page can be used to modify the Web page without generating a physical representation of the aggregated viewing data.

In one embodiment, the techniques described herein can be implemented as sequences of instructions executed by an electronic system. The sequences of instructions can be stored by the electronic system or the instructions can be received by the electronic device (e.g., via a network connection). The instructions can be executed by multiple electronic systems.

For example, one or more eye tracking systems can gather eye tracking data from individual users, the data can be transmitted (e.g., via a network) to one or more electronic systems that compile and/or process the data, which can then promote the processed data to any of a variety of user-accessible formats (e.g., a graphical output on a display device, a file accessible via a server, a printed page, input to another system). As another example, all of the instructions can be executed by a single electronic system (e.g., a computer system with an eye tracking camera and appropriate software for gathering and processing eye tracking data).

FIG. 1 is a block diagram of one embodiment of an electronic system. The electronic system illustrated in FIG. 1 is intended to represent a range of electronic systems, for example, computer systems, network access devices, personal digital assistants (PDAs), etc. Alternative electronic systems can include more, fewer and/or different components. For reasons of simplicity of description, electronic system 100 is described with an eye tracking device; however, the eye tracking device is not required to be part of the same electronic system that processes the eye tracking data.

Electronic system 100 includes bus 101 or other communication device to communicate information, and processor 102 coupled to bus 101 to process information. While electronic system 100 is illustrated with a single processor, electronic system 100 can include multiple processors and/or co-processors. Electronic system 100 further includes random access memory (RAM) or other dynamic storage device 104 (referred to as memory), coupled to bus 101 to store information and instructions to be executed by processor 102. Memory 104 also can be used to store temporary variables or other intermediate information during execution of instructions by processor 102.

Electronic system 100 also includes read only memory (ROM) and/or other static storage device 106 coupled to bus 101 to store static information and instructions for processor 102. Data storage device 107 is coupled to bus 101 to store information and instructions. Data storage device 107 such as a magnetic disk or optical disc and corresponding drive can be coupled to electronic system 100.

Memory 104 includes eye tracking application(s) 162 that operate on eye tracking data 166 to generate output representative of viewing data. Additional eye tracking data (not shown in FIG. 1) can be stored on storage device 107 or accessed via network interface 130. Specific functionality of eye tracking application(s) 162 and uses of eye tracking data 166 are described in greater detail below.

Memory 104 contains operating system 160, which directs operations of system 100. In one embodiment, operating system 160 is the highest layer of control of system 100. Applications 164 are lower layers of system control in that they direct operation within the allowable context of higher system layers. Application(s) 164 may contain user programs (e.g., word processor(s), electronic mail (e-mail) programs).

Electronic system 100 can also be coupled via bus 101 to display device 121, such as a cathode ray tube (CRT) or liquid crystal display (LCD), to display information to a computer user. Alphanumeric input device 122, including alphanumeric and other keys, is typically coupled to bus 101 to communicate information and command selections to processor 102. Another type of user input device is cursor control 123, such as a mouse, a trackball, or cursor direction keys to communicate direction information and command selections to processor 102 and to control cursor movement on display 121. Electronic system 100 further includes network interface 130 to provide access to a network, such as a local area network.

Eye tracking device 150 is coupled to bus 101 and generates eye tracking data 166 that can be stored in memory 104 and/or storage device 107. Eye tracking device 150 can be any type of eye tracking device known in the art. For example, eye tracking device 150 can track eye movement via optical, electrical, magnetic and/or other techniques.

Instructions are provided to memory from a storage device, such as magnetic disk, a read-only memory (ROM) integrated circuit, CD-ROM, DVD, via a remote connection (e.g., over a network via network interface 130) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

In one embodiment, eye tracking device 150 generates raw data representing eye position and movement. The raw data is transferred via bus 101 to memory 104 and stored as eye tracking data 166. Processor 102 executes eye tracking application(s) 162 to interpret eye tracking data 166. Eye tracking application(s) 162 interpret various levels of eye tracking data.

At the lowest level, eye tracking data is interpreted to identify elementary features. Eye tracking data can be, for example, two-dimensional (x,y) eye gaze positions, three-dimensional (x,y,z) gaze positions, sample time (t), pupil diameter (d), whether the eye is open or closed, and/or other related information such as biofeedback (e.g., sweat, temperature, heart rate, breathing rate) information. Gaze information can include duration, latency and/or other information related to a particular gaze. Elementary features that are determined from the eye tracking data can be, for example, fixations (position, time and/or duration), saccades (magnitude, direction and/or velocity), smoother pursuit motion (path taken by eye, velocity), blinks (duration).

In one embodiment, a fixation is defined as a statistically significant clustering of raw eye tracker data within some space-time interval. A fixation may be identified by analyzing the raw eye tracker data stream to determine if most of the eye positions during a predetermined minimum fixation time interval are within a predetermined minimum fixation space interval. For example, the raw eye tracker data stream can be analyzed to determine whether at least 80% of the eye positions during a 50 ms time interval are within a 0.25 degree space interval. Other values can also be used and other techniques can be used to identify a fixation. Many techniques are known in the art and any technique for identifying fixations can be used.

A saccade can be defined as the displacement and direction between two fixations. Other elementary features, for example, blinks, smooth pursuit motion and the angel of eye rotation within the head can also be determined from the raw eye tracker data stream.

The elementary features can then be interpreted to determine eye movement patterns. Eye movement patterns can include, for example, revisits, significant fixations, vertical saccades, horizontal saccades, short saccade runs, etc. In one embodiment, an eye movement pattern is a collection of elementary features that satisfies a set of criteria associated with a predetermined eye movement pattern template. In one embodiment, elementary feature data is analyzed after each saccade to determine whether a predefined eye movement pattern exists.

In one embodiment, the eye movement patterns are defined as follows; however, other definitions can be used for the eye movement patterns and other eye movement patterns can be defined. A "revisit" is a current fixation being within 1.2 degrees of one of the five most recent fixations, excluding the fixation immediately prior to the current fixation. In one embodiment, a "significant fixation" is a fixation of significantly longer duration when compared to other fixations in the same category.

A "vertical saccade" is a saccade in which the vertical (y) displacement is more than twice the horizontal (x) displacement and the horizontal displacement is less than one degree. A "horizontal saccade" is a saccade in which the horizontal displacement is more than twice the vertical displacement and the vertical displacement is less than one degree. A "short saccade run" is a sequence of short saccades collectively spanning a distance of greater than five degrees.

Eye movement patterns can provide information regarding the mental state of a viewer. For example, if a viewer makes a small saccade from a fixation, the viewer is making a knowledgeable movement because they are moving into an area visible through peripheral vision. As another example, a short saccade run indicates that the viewer is looking for an object locally. A large saccade after a significant fixation followed by a small number of small saccades indicates knowledgeable movement to a remembered location. Multiple large saccades indicates global searching, which occurs when the viewer is searching a large area for a target.

Eye movement patterns are interpreted to determine eye behavior patterns. An eye behavior pattern is one or more eye movement patterns that satisfy a predetermined criteria. In general, recognition of eye behavior patterns does not require a priori knowledge of the viewer's visual field. Thus, mental states of the viewer can be inferred without reference to the visual field. However, application of graphical representations of mental states and/or eye movements to the visual field can provide useful information for design, use, modification or other purposes related to the contents of the viewer's visual field.

The examples and definitions of eye behavior patterns that follow are intended to be representative rather than exhaustive. Additional and/or different eye behavior patterns can be supported. Also, different definitions can be applied to the individual eye behavior patterns. A "best fit line" is a sequence of at least two horizontal saccades to the left or right. "Reading" is a best fit line to the right (for English and other languages that are read left to right) or a short horizontal saccade while the current state is reading.

"Reading a block" is a sequence of best fit lines to the right separated by large saccades to the left, where the best fit lines are regularly spaced in a downward sequence and (typically) have similar lengths. "Re-reading" is reading a previously read area. "Scanning" or "Skimming" is a sequence of best fit lines to the right joined by large saccades with a downward component, where the best fit lines are not regularly spaced or of equal length.

"Thinking" is defined by, for example, several long fixations separated by short saccades. "Spacing out" is defined by, for example, several long fixations separated by short saccades continuing over a long period of time. "Searching" is a short saccade run, multiple large saccades, or many saccades since the last significant fixation or change in user state. "Re-acquaintance" is similar to searching with longer fixations and consistent rhythm.

Figure 2:
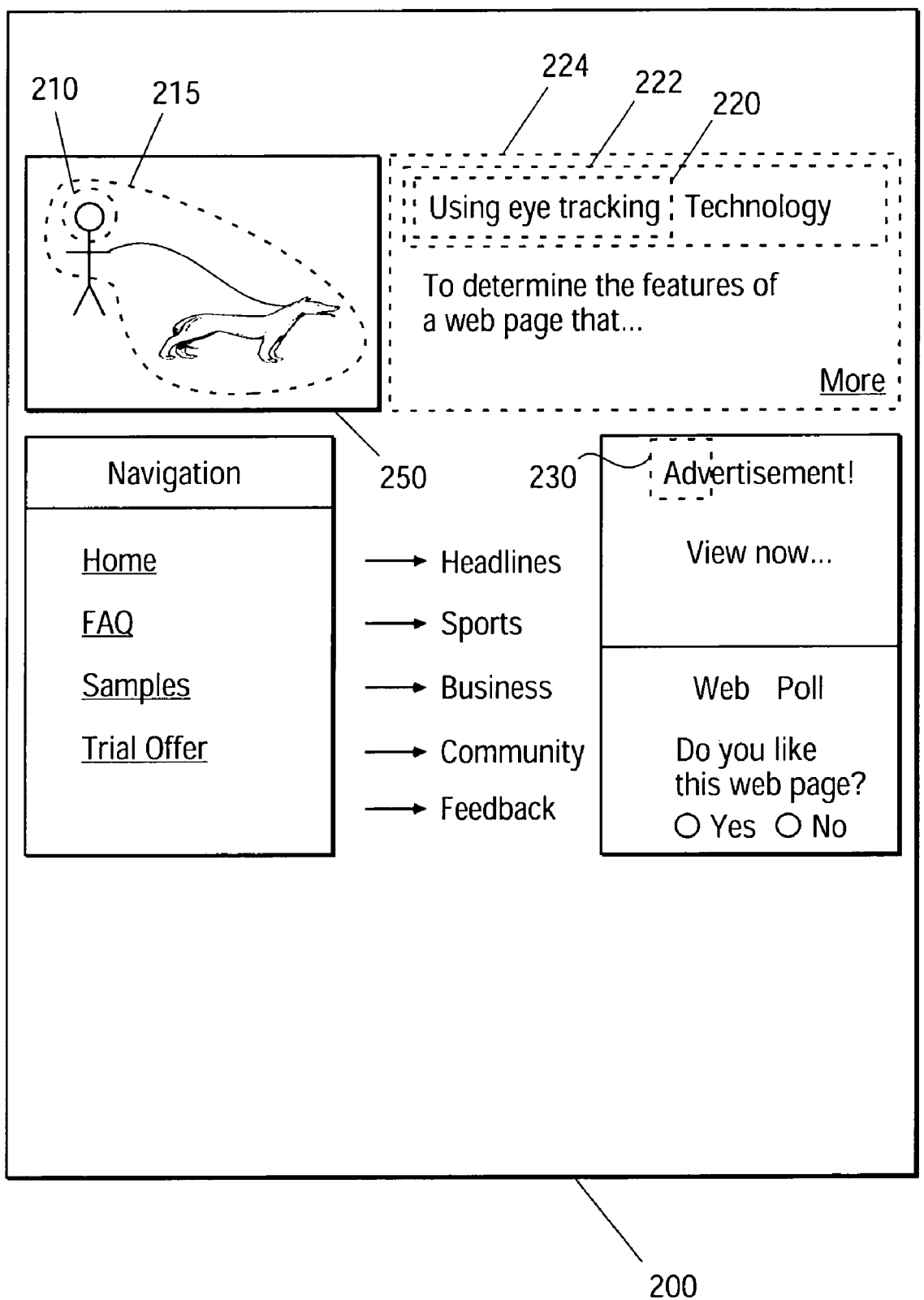
FIG. 2 illustrates an example World Wide Web page having aggregated eye tracking data overlaid.

FIG. 2 illustrates an example World Wide Web page having aggregated eye tracking data overlaid. Aggregated eye tracking data can be accumulated and represented for other types of visual fields for a set of viewers. For example, eye tracking data can be gathered for a set of viewers reading a book, or viewers of a three-dimensional object such as a work of art or an automobile. The aggregated eye tracking data can be accumulated using multiple techniques.

In one embodiment, eye tracking data from multiple individuals (either from multiple eye tracking devices or a single eye tracking device) can be aggregated by an electronic system (e.g., a computer system) and the aggregated eye tracking data can be used to create a graphical representation of the aggregated eye tracking data. In another embodiment, eye tracking data from a single individual can be used to create a graphical representation of the eye tracking data. Eye tracking data from another individual can be combined graphically with the graphical representation to create a graphical representation that combines both individuals. This can be repeated for any number of individuals.

Web page 200 presents a combination of graphical and textual fields that a viewer can observe. For example, graphical image 250 represents a person walking a dog. In one embodiment, regions 210 and 215 provide an indication of the percentage (or total number) of viewers that viewed the region within the indicators. In general, a larger percentage of viewers were tracked viewing the region within region 210 as compared to region 215. This difference can be presented, for example, as different colors for the different regions, the different regions can be blurred to different extents, and/or the opacity of the region can indicate the viewing percentage or number.

In one embodiment, a region is considered viewed if the boundaries of the region circumscribe the boundaries of an elementary feature (e.g., a fixation or a gaze). In alternate embodiments, for example, when regions are smaller than the area used to indicate a fixation or a gaze, a region is considered viewed if the elementary feature overlaps the region. In one embodiment, different shapes can be associated with different elementary features.

In one embodiment, the shape of the region is selected based on the eye behavior pattern associated with the underlying region. For example, fixations can be represented as circles, glances as larger circles, reading as a rectangular region. Regions 220, 222 and 224 provide examples of reading by viewers. In the example, of FIG. 2, region 220 indicates the percentage/number of viewers that read the first three words of text. Region 222 indicates the percentage/number of viewers that read the first line of text. Region 224 indicates the percentage/number of viewers that read the full passage.

The manner in which the various regions indicate the number of viewers that viewed the respective regions can be selected based on the underlying viewing field. For example, colors or shades of gray can be used to indicate the number and/or percentage of viewers that viewed a particular region, or blurring can be used. These or similar techniques can also be used to indicate other viewing data, for example, the length of time each region is viewed, or to provide some indication of time lapse.

Additional indicators can be provided to represent viewer actions. For example, if one or more viewers clicked on the "more" link to read additional text, an indication of an action taken can be overlaid on the "more" link. Other action indicators can also be provided.

Figure 3:
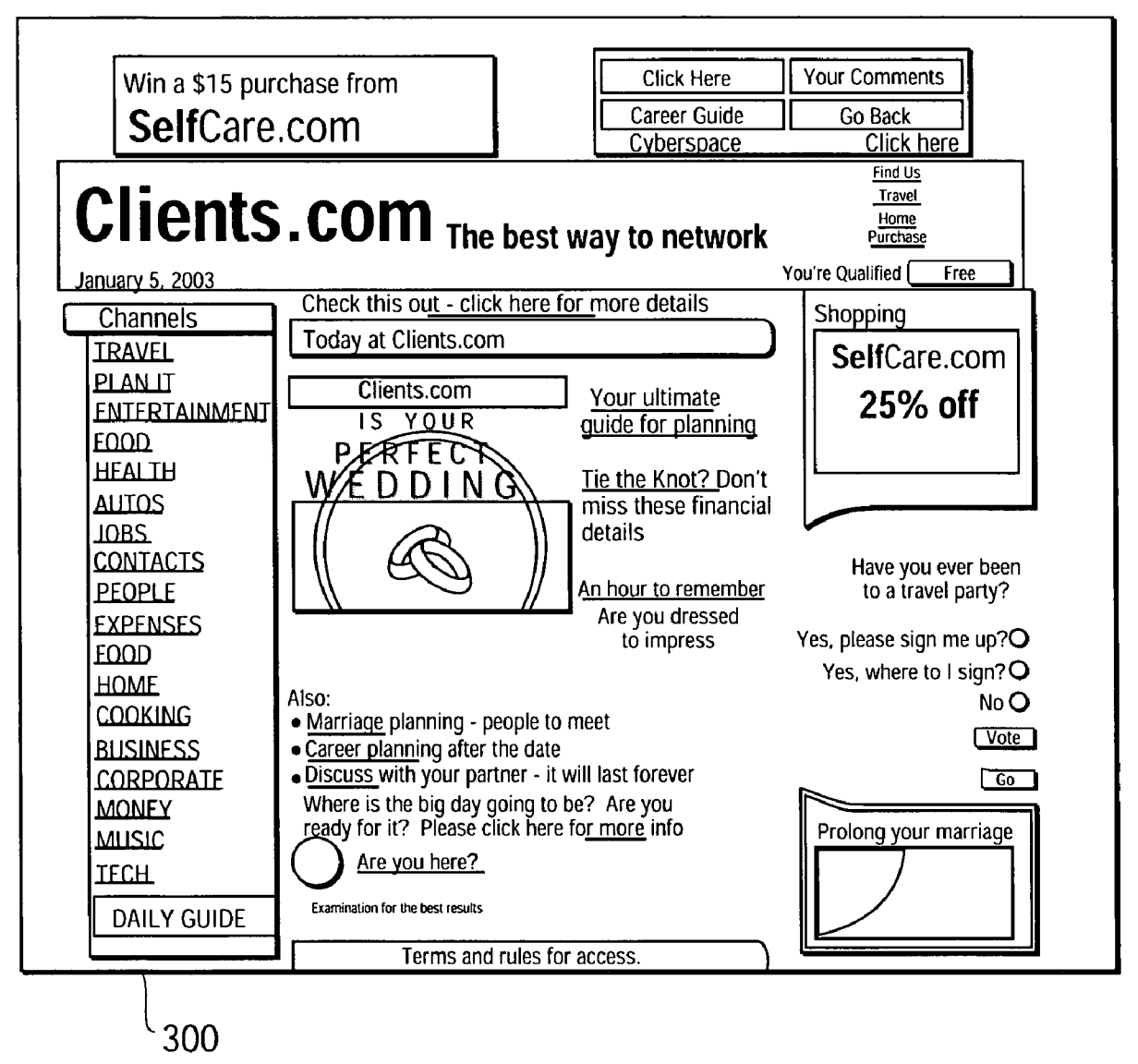

FIG. 3 illustrates a second example World Wide Web page to be used for gathering eye tracking data. Web page 300 is a fictional Web page that is provided as an example of a typical Web page for which eye tracking data can be gathered. As viewers interact with Web page 300 by reading, navigating, clicking, or otherwise viewing Web page 300, an eye tracking device, for example, a camera beneath the display device that displays Web page 300; however, the eye tracking device can be placed in any location that provides sufficient access to the viewer's eyes to provide eye tracking data.

Figure 4:
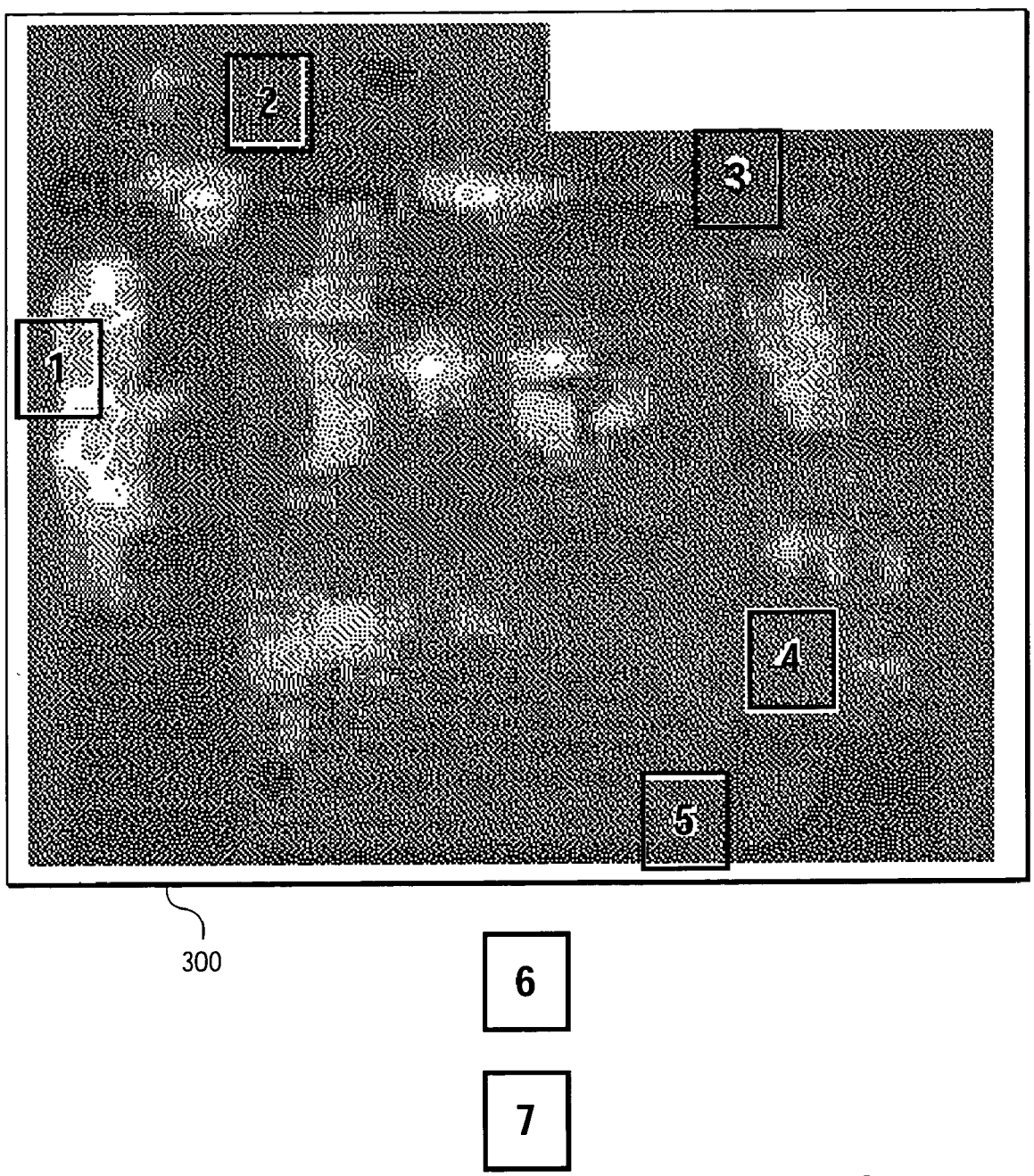
FIG. 4 illustrates the second World Wide Web page having aggregated eye tracking data overlaid using a blending presentation technique.

FIG. 4 illustrates Web page 300 with aggregated eye tracking data overlaid using a blending presentation technique. In one embodiment, an aggregate viewing mask is generated in which the percentage of viewers that viewed a particular region of Web page 300 determines the opacity of the region. The aggregate viewing mask is used as a foreground and the viewed image is a background for use in an alpha blending operation. For example, if 100% of viewers viewed region, the opacity of the region is 0%. In other words, the region is transparent and the corresponding background region is not obscured by the foreground region. As another example, if 50% of viewers viewed a region, the opacity of the region is 50%, or 50% transparent.

In one embodiment, the aggregate viewing mask is alpha blended with Web page 300. Alpha blending is the process of combining a foreground image (e.g., the viewing mask) with a background image (e.g., Web page 300) to produce a new blended image. The degree of the foreground image's translucency may range from completely transparent to completely opaque. If the foreground image is completely transparent, the blended image will be the background image. Conversely, if the foreground image is completely opaque, the blended image will be the foreground image. Of course, the translucency can range between these extremes, in which case the blended image is computed as a weighted average of the foreground and background images.

In one embodiment, the translucency of the background image is 20% and the translucency of the foreground image is 80%. The color of each region is selected based on the percentage/number of viewers that viewed a region of the background image. As a further indicator of viewing percentages, the various regions may be color coded based on the percentage/number of viewers that viewed a region.

Figure 5:
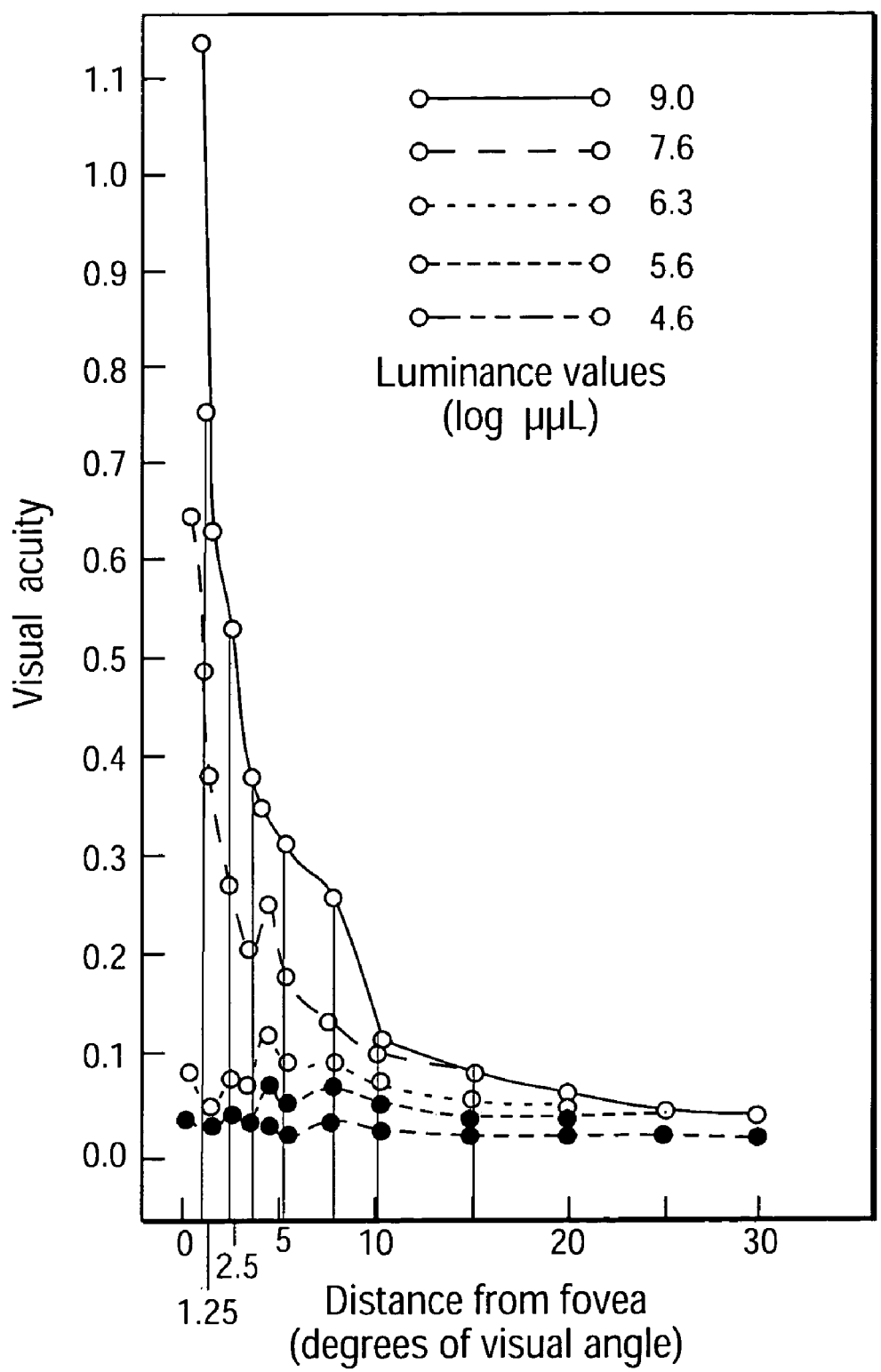
FIG. 5 illustrates one version of a visual acuity gradient that can be used to graphically represent viewing data.

In an alternate embodiment, the background image of Web page 300 is blurred to represent the viewing percentages/numbers. In one embodiment, the blurring is based on a acuity gradient that represents what a human eye actually sees. FIG. 5 illustrates one version of a visual acuity gradient that can be used. The gradient of FIG. 5 is from "Medical Physiology, Volume One," Vernon B. Mountcastle, M.D., page 463, published by the C.V. Mosby Company, 1974.

In another alternate embodiment, the aggregate viewing mask used as the foreground image can include grayscale indications of the percentage/number of people viewing a particular region. For example, lighter shades of gray can indicate a higher viewing percentage while darker shades of gray indicate lower viewing percentage. The foreground image is then alpha blended with the background image to generate a visual representation of the aggregate viewing data.

Figure 6:
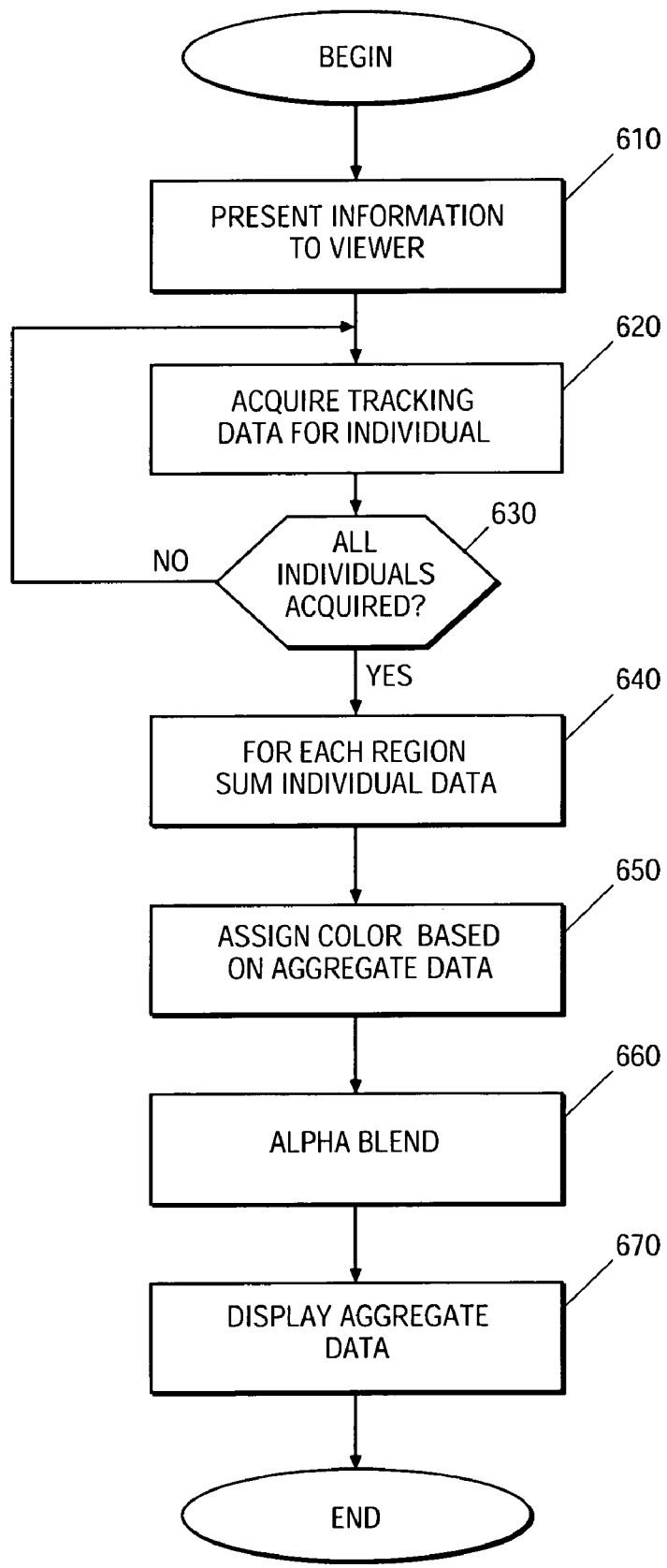
FIG. 6 is a data flow diagram of one embodiment of a technique for gathering and presenting aggregate viewing data.

FIG. 6 is a data flow diagram of one embodiment of a technique for gathering and presenting aggregate viewing data. The example of FIG. 6 results in a representation of the view alpha blended with a color representation of the view data. As described above, other types of representations can be used. In one embodiment, the flow of FIG. 6 is accomplished by an electronic system, for example, the electronic system of FIG. 2; however, any combination of hardware, software or hardware and software can be used.

Information is presented to a viewer, 610. The information presented to the user can be, for example, a Web page on a display device of a computer system or a book or any other type of information. An eye tracking device is positioned to track the eyes of the person viewing the information. For example, a camera having eye tracking functionality can be placed in the bottom of the display device of the computer system or the camera can be placed on the top of the book. Any technique and/or devices known in the art for tracking eye movements can be used.

Eye tracking data is acquired for an individual, 620. The eye tracking data is stored by a computer system or other data acquisition device for later processing. If eye tracking data for all of the individuals to be tracked is not acquired at 630, eye tracking data for another individual is acquired, 620.

If eye tracking data for all of the individuals to be tracked is acquired at 630, the individual data for each region of the information is summed and/or averaged, 640. In one embodiment, a region consists of a one pixel region on a Web page. However, any number of pixels can be used to define a region. Other definitions of regions of the information can also be used. Summing of individual viewing data can be accomplished, for example, by determining whether each individual viewer viewed a particular region and summing the number of viewers that viewed the region. The sum or average is then associated with each region for purposes of generating a representation of the aggregate viewing data. The sum of aggregate viewing data is an aggregate viewing mask.

In one embodiment, a color is assigned to each region based on the aggregate viewing data for the region, 650. Representations other than colors can also be used, for example, gray scaling can be used, or blurring can be used. In one embodiment, shades of reds and oranges are used to represent a majority of viewers viewing a particular region and shades of greens and blues are used to represent a minority of viewers viewing the region and black or gray to represent no viewers viewing the region. Other color schemes can also be used.

An alpha blend is performed on a representation of the information and the aggregate viewing mask. In one embodiment, the background image (e.g., the Web page viewed by the viewers) is assigned a 20% opacity and the foreground image (e.g., the aggregate viewing mask) is assigned an 80% opacity. In addition to the colors on the aggregate viewing mask, the individual regions can also have an opacity based on the percentage of viewers that actually viewed the region. The alpha blended images are displayed, 670.

Figure 7:
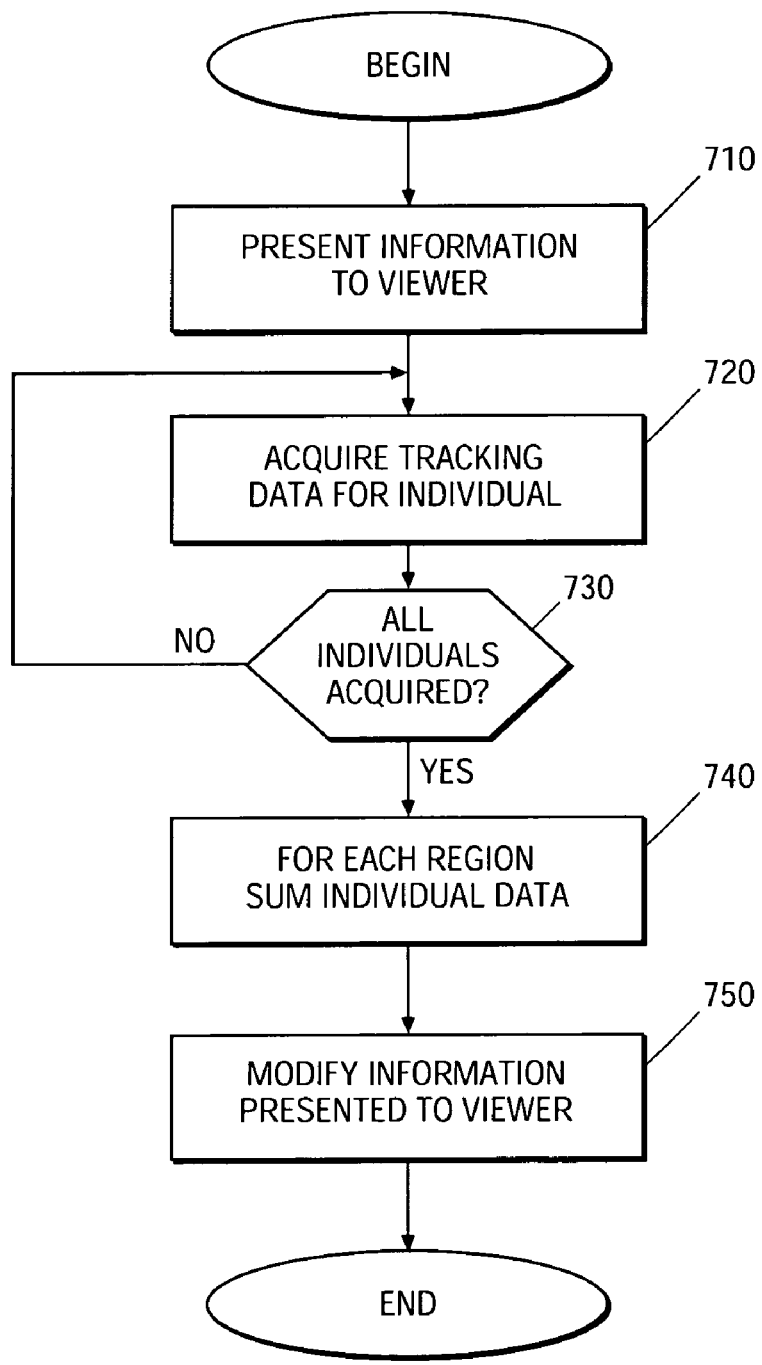
FIG. 7 is a flow diagram of one embodiment of a technique for modifying a visual scene based on aggregate viewing data.

FIG. 7 is a flow diagram of one embodiment of a technique for modifying a visual scene based on aggregate viewing data. In one embodiment, the flow of FIG. 7 is accomplished by an electronic system, for example, the electronic system of FIG. 2; however, any combination of hardware, software or hardware and software can be used.

Information is presented to a viewer, 710. The information presented to the user can be, for example, a Web page on a display device of a computer system or an application program or any other type of information. An eye tracking device is positioned to track the eyes of the person viewing the information. Any technique and/or devices known in the art for tracking eye movements can be used.

Eye tracking data is acquired for an individual, 720. The eye tracking data is stored by a computer system or other data acquisition device for later processing. If eye tracking data for all of the individuals to be tracked is not acquired at 730, eye tracking data for another individual is acquired, 720.

If eye tracking data for all of the individuals to be tracked is acquired at 730, the individual data for each region of the information is summed and averaged, 740. The aggregated data is then used to modify information presented to the user, 750. For example, the layout of a Web page can be modified based on the aggregated data. As another example, the layout of an application program can be modified based on the aggregated data. The aggregated data can be used to modify other types of information as well.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   acquiring data representing eye movements for one or more individuals;
   generating result data that graphically represents the data representing eye movements for the one or more individuals by blurring an image based on a visual acuity gradient applied to the data representing eye movements; and
   promoting the result data to a user-accessible state.

2. The method of claim 1 wherein promoting the result data to a user-accessible state comprises displaying the result data with a display device.

3. The method of claim 1 wherein promoting the result data to a user-accessible state comprises storing the result data on an electronically-accessible medium.

4. The method of claim 1 wherein the result data that graphically represents the data representing eye movements for the one or more individuals comprises alpha blending of an image and a colorized representation of the data representing the eye movements.

5. An article comprising an electronically-accessible medium to provide instructions that, when executed, cause one or more electronic systems to:
   acquire data representing eye movements for one or more individuals;
   generate result data that graphically represents the data representing eye movements for the one or more individuals by blurring an image based on a visual acuity gradient applied to the data representing eye movements; and
   promote the result data to a user-accessible state.

6. The article of claim 5 wherein promoting the result data to a user-accessible state comprises displaying the result data with a display device.

7. The article of claim 5 wherein promoting the result data to a user-accessible state comprises storing the result data on an electronically-accessible medium.

8. The article of claim 5 wherein the result data that graphically represents the data representing eye movements for the one or more individuals comprises alpha blending of an image and a colorized representation of the data representing the eye movements.

* * * * *